(12) United States Patent
Kepley

(10) Patent No.: US 9,114,772 B2
(45) Date of Patent: Aug. 25, 2015

(54) CENTRIPETAL PHASE SHIFT ISOLATION CONTROL SYSTEM, IN DEFLECTION, DAMPEN, DISSIPATION, TRANSPOSITION AND ISOLATION OF A STOCHASTIC VECTOR

(71) Applicant: Bruce L Kepley, San Jose, CA (US)

(72) Inventor: Bruce L Kepley, San Jose, CA (US)

( * ) Notice: Subject to any disclaimer, the term of this patent is extended or adjusted under 35 U.S.C. 154(b) by 13 days.

(21) Appl. No.: 14/091,352

(22) Filed: Nov. 27, 2013

(65) Prior Publication Data

US 2015/0149041 A1  May 28, 2015

(51) Int. Cl.
  *B60R 21/00* (2006.01)
  *B60R 21/01* (2006.01)
  *F16F 7/10* (2006.01)
  *B60R 22/00* (2006.01)

(52) U.S. Cl.
  CPC .............. *B60R 21/01* (2013.01); *F16F 7/1005* (2013.01); *B60R 2021/01286* (2013.01)

(58) Field of Classification Search
  CPC .............. B60R 21/013; B60R 21/0132; B60R 21/0134; B60R 21/015; B60R 2021/01516
  USPC .......................................................... 701/45
  See application file for complete search history.

(56) References Cited

U.S. PATENT DOCUMENTS

| | | | |
|---|---|---|---|
| 8,156,806 B1* | 4/2012 | Cardarelli | 73/511 |
| 2002/0185324 A1* | 12/2002 | Campbell et al. | 180/271 |
| 2006/0090946 A1* | 5/2006 | Zhao et al. | 180/268 |
| 2007/0168098 A1* | 7/2007 | Lich et al. | 701/46 |
| 2008/0040004 A1* | 2/2008 | Breed | 701/45 |
| 2008/0147277 A1* | 6/2008 | Lu et al. | 701/45 |
| 2010/0042323 A1* | 2/2010 | Harada et al. | 701/300 |

* cited by examiner

*Primary Examiner* — Mary Cheung
*Assistant Examiner* — Atul Trivedi

(57) ABSTRACT

A CPS dampen, dissipation, deflection and isolation control system includes a first structure comprising at least one chamber 121; a second structure comprising at least one chamber 122, wherein the chamber of the first structure 121 and the chamber of the second structure 122 are interposed by an elastic element 130, wherein the first structure 121 is moveably attached by signal to the second structure 122, wherein an intruding vector is identified for a qualified gait, wherein the first structure is configured in isolation of a vector intrusion of the second structure, whereby inertia dissipation of the first structure and substantial isolation of the intruding vector of the second structure is performed in a degree of freedom of the embodiment datum.

17 Claims, 12 Drawing Sheets

CHAMBER SECTION, PREDEPLOYMENT

FIG. 1
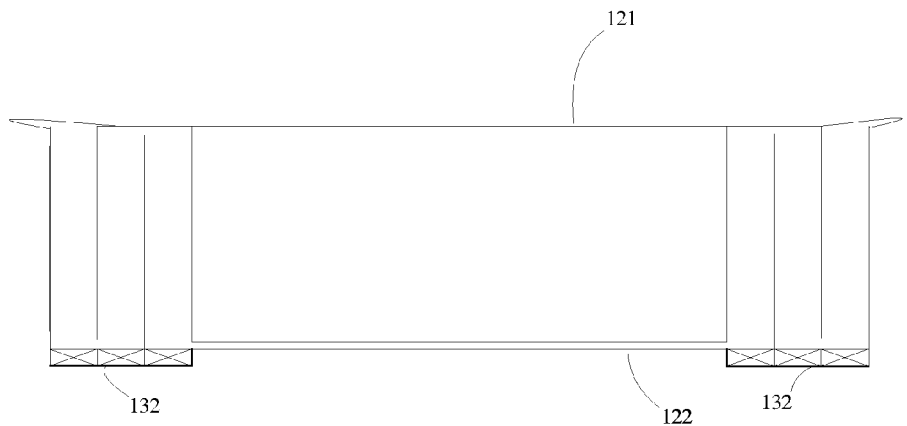
CHAMBER SECTION, PREDEPLOYMENT
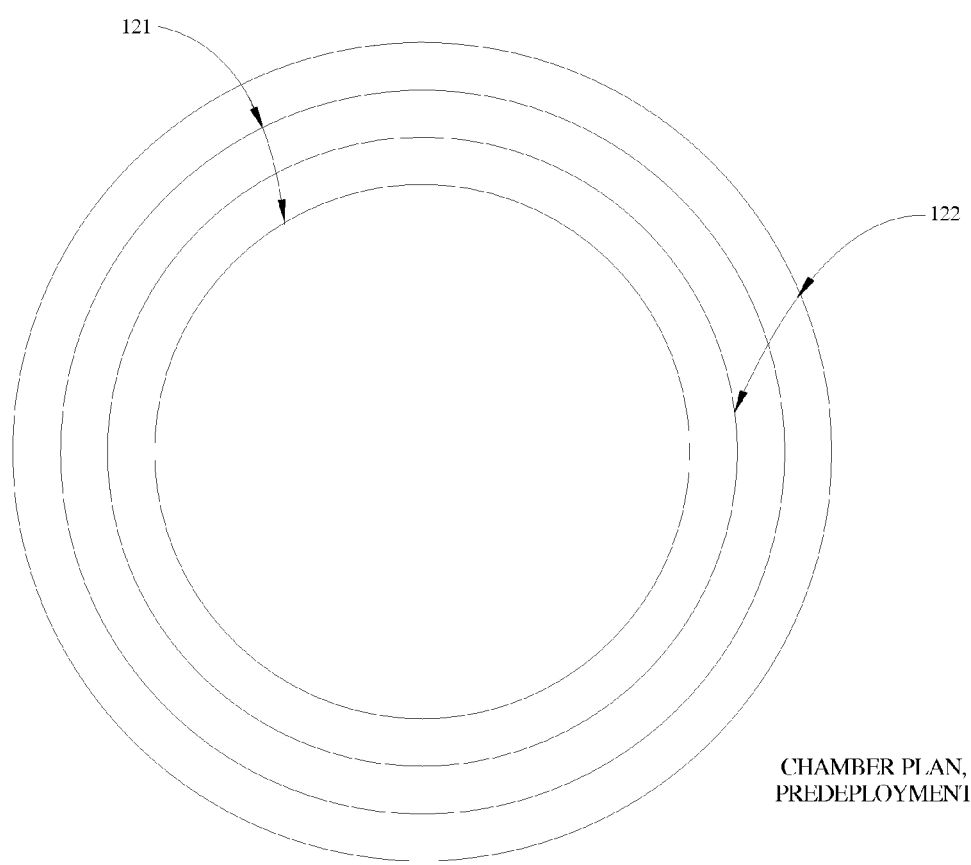
CHAMBER PLAN, PREDEPLOYMENT

FIG. 2
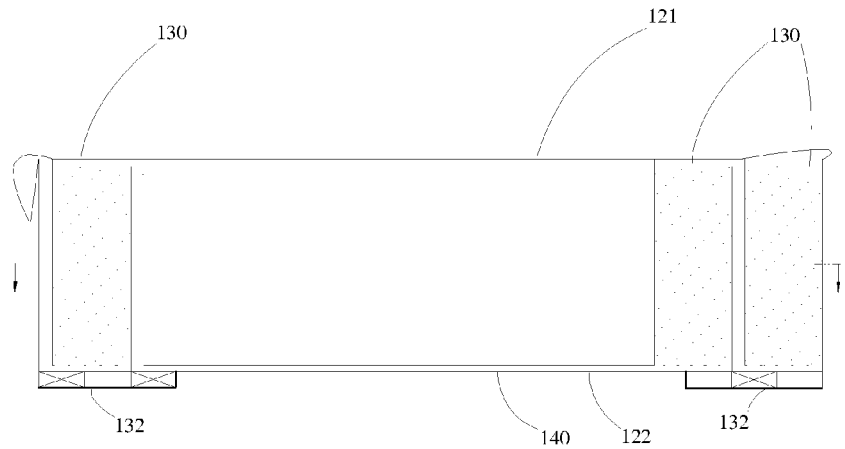
CHAMBER SECTION
at ACTIVATION
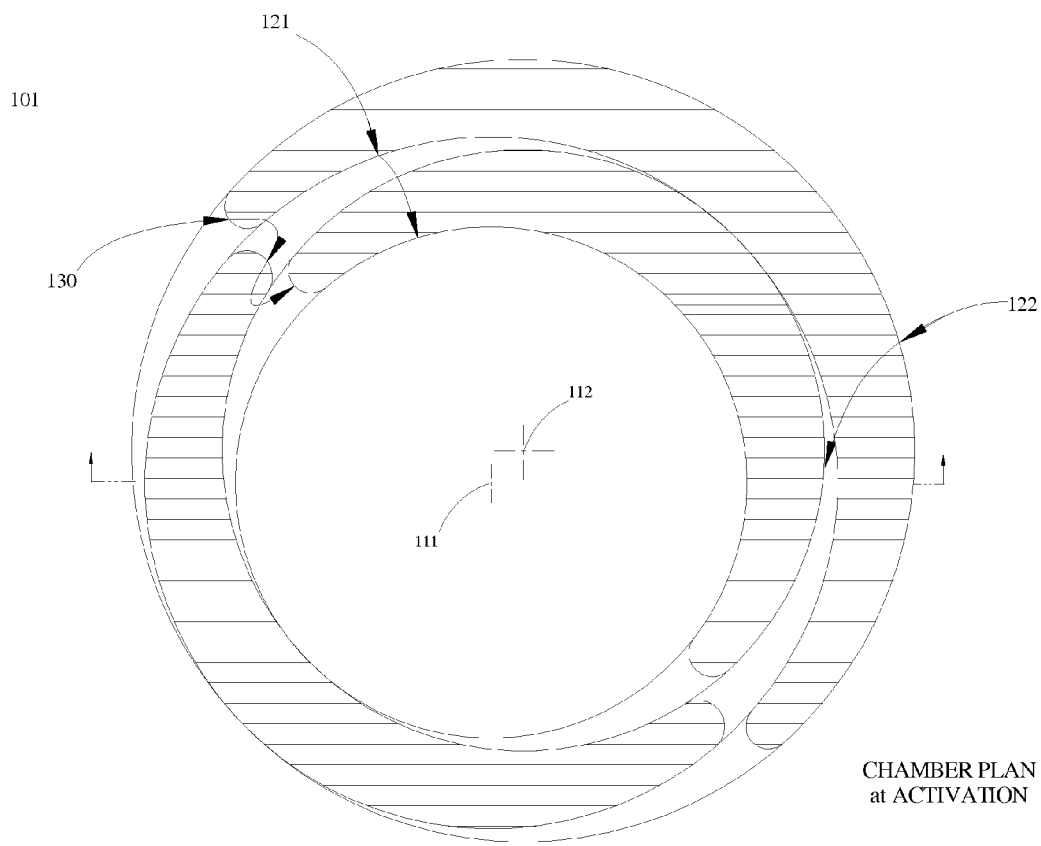
CHAMBER PLAN
at ACTIVATION

FRONTAL VECTOR SEQUENCE
GAIT 1
ALIGNMENT SET A

RIGHT VECTOR SEQUENCE
GAIT 4
ALIGNMENT SET A

ALTERNATE GAIT SET

6 CHAMBER APPLICATION

BEARINGS APPLICATION

FIG. 12

**CPS Dampen, Deflection and Isolation Control System
Callouts**

| | |
|---|---|
| 101. | CPS Dampen, Deflection and Isolation Control System |
| 111. | PM |
| 112. | UPM |
| 118. | Force Transfer Beam |
| 121. | Chamber PM |
| 122. | Chamber UPM |
| 130. | Elastic Element |
| 132. | Elastic Element Storage |
| 137. | Storage Ledger |
| 140. | UPM Connection |
| 142. | PM Connection |
| 144. | PM Suspension |
| 160. | Explosive Bolt Head |
| 164. | Controller |
| 168. | Sensors |

CENTRIPETAL PHASE SHIFT ISOLATION CONTROL SYSTEM, IN DEFLECTION, DAMPEN, DISSIPATION, TRANSPOSITION AND ISOLATION OF A STOCHASTIC VECTOR

BACKGROUND

Upon impact, occupants of a vessel experience forces tending to cause physiological stress. It is desirable to reduce the physiological stress, thereby reducing trauma and injury.

The automotive safety application of the embodiment addresses immediate concerns of vehicle occupants. The recent increased CAFÉ standards stultify conventional efforts in employing acceptable means of dissipating the transfer of shock during any type of collision. The new standards mandate industry design to minimize available mass, traditionally used for protection and dissipative means. Vehicles must conform to the new 54.5 MPG standard as OEMs realize the sober expectation of more expensive and unsafe vehicles, causing millions to refuse economics of the new car market and its associated increases in death and injury.

Conventionally speaking, the answer to shielding the occupant during a sudden acceleration event is to secure him to a two ton mass, and place a few cushions between him and the mass. This may prevent some from ricocheting off the interior, or going through the windshield. Its commonly understood, those forces can stress the occupant, in a multitude of directions, to a fractious outcome. Yet, oftentimes in the presence of a stochastic vector, the occupant is unable to remain secured to receive any substantial form of anticipated protection.

The exercise of extensive efforts identifying the position of passengers, for qualifying deployment of airbags, and recognizing the possible negative consequences of airbag contact for an occupant out of acceptable positioning, may be an opportunity for the industry to recognize system limitation and potential for an alternative approach.

Even the most aggressive protection designs in occupant restraint systems, provide little or no means for controlled force deflection. Requiring the body and restraint system to assimilate full scale acceleration forces immediately upon impact. The roughly thirty percent who are saved as a result, can be thankful for the present state of technology. Yet, the present and future demands to resolve opportunities for safety are expected to only escalate.

SUMMARY

Provided in one embodiment is a CPS dampen, dissipation, deflection and isolation control system comprising a first structure, comprising at least one chamber, a second structure comprising at least one chamber, and one or more elastic elements interposed at the chamber of the second structure and chamber of the first structure, wherein the first structure is moveably attached to the second structure, whereby the masses are isolated, and whereby a PM is isolated of an identified UPM vector performing in a directional degree of freedom comprising an embodiment datum and the PM inertia vector is substantially deflected, dampened and dissipated.

BRIEF DESCRIPTION OF THE DRAWINGS

For a better understanding of the nature and objects of some embodiments, reference shall be made to the following detailed description taken in conjunction with the accompanying drawings.

FIG. 1 illustrates an example of a centripetal phase shift, or CPS isolation control system in a concentric pre-deployment state, PM Centered.

FIG. 2 illustrates an example of a PM Centered CPS isolation control system at early state activation.

FIG. 12 is the components callout list, associating each identifying number.

DEFINITIONS

Figure 3A:
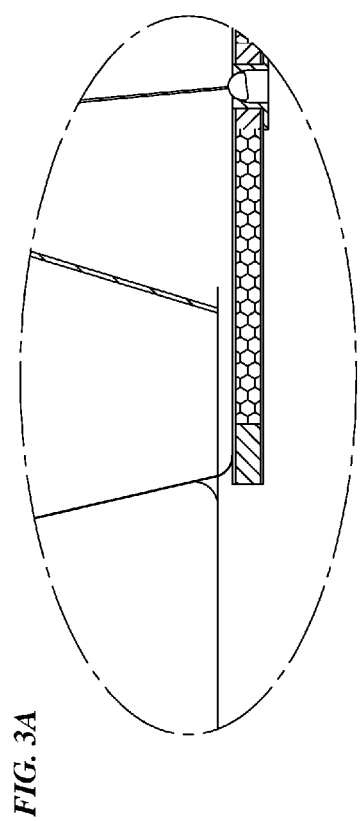
FIG. 3A illustrates a magnified embodiment suspension section view.

"acceleration episode": A given point or duration of time a mass is subject to change by a vector influence.

"angle of incidence": A term denoting the proximity of the PM chamber element to the UPM chamber element, and may be monitored as a contributing indicator of embodiment performance.

"CPS": Acronym of the term Centripetal Phase Shift. A CPS is a centripetal induced phase shift. Specifically here, the transposition of a force vector to a centripetal path of dissipation is performed. Resulting in a phase change, or shift of energy acting upon a selectively isolated configuration in one of two masses, from an original mass.

"elastic element": An element rendering physical elastic characteristics, i.e.: elastomers, bimorph, magnetic, piezoelectric or other actuators, singular or in association with materials responsive to signal in changing form or elemental structure for their elastic property, or elastic characteristics caused, in association with other elements, by way of example, a bimorph actuator, MRF, gasses and other hydraulics.

"gait": The term used in identifying the configuration setting of the PM position, path and direction of its dissipation, prepared at initiation of the CPS isolation control system. The gait configuration comprises three elements: location of the point energy is initiated upon the UPM, referred here as the UPM vector transfer, the PM dissipation path and its direction. An intruding vector's UPM point of vector transfer is identified or projected, qualifying the implementation of a gait.

"hydraulic medium": Includes fluids, powders, gasses, not limited to MRF, magnetorheological fluids, ERF, other viscoelastics, foam, hydraulic fluid, and air, serving as force transfer and dissipation agents, contained in a force control, containment or transfer device, as a dampen or absorber system. May contain an inlet and outlet with a valve or regulating function. And may provide a means to preserve pressure within a system, for stabilization and prevention of cavitation, as a reservoir.

"isolation": Isolation is associated here with partial and total disconnect, or disassociation of one mass from another. In this document, the PM, versus the UPM. Dampen is commonly associated as a means of achieving isolation, yet the terms elastic suspension, dissipation, deflection and others, are used here in further describing featured states of energy, occurring upon a mass during an event of energy transfer, or a process to achieve isolation of a mass. The term is commonly recognized as a means to detach, deflect, redirect, dampen, or dissipate undesirable effects of a vector.

"PM": The acronym of the term, 'protected mass', denotes a mass protected from an intruding force vector disturbance. The PM is the isolated mass, separated from effects of the 'unprotected mass', comprised largely of occupants and facilities for occupant seating and restraint anchorage, standing or rest of occupants, optional storage protection of cargo, animals and those force transfer elements of the embodiment designated as such. And may comprise any set of elements designated for protection by design. A 'PM or UPM centered' embodiment is characterized by notation of the minor chamber of chamber sets.

"Point of vector transfer": A point of vector transfer is recognized as a point, comprising a vector at a mass or intersecting masses.

"sensors": Devices used in detection and analysis of an energy, vector, heat, frequency, radar, mass, position, distance, direction, velocity, acceleration, pressure and/or density, for signal transmission to a controller.

"suspension": The suspending of an element. The associated application here is suspension by any one or more stable or unstable pendulums, or combination, suspension plane, combination pendulum and suspension plane, or slide for a free associative state of the PM.

"toroidal": A form composed of toroidal elements.

"transport vessel": Used in transport of occupants and/or cargo.

"UPM": An acronym of the term 'unprotected mass', any mass unprotected by the embodiment. Typically the vessel and mass elements the PM is designed to be isolated from.

The following terms may be synonymous or interchangeable in associating a condition or object, related to this document:
chamber/cylinder/rotational element
controller/ECU/electronic control unit/memory
absorber/actuator/bimorph actuator/damper/dampen/elastic element CPS dampen, deflection and isolation control system/CPS isolation control device/CPS isolation control system/CPS system/Centripetal Phase Shift/transposition
vehicle/vessel

DETAILED DESCRIPTION

Provided, in one embodiment, is a centripetal phase shift, or CPS dampen, dissipation, deflection and isolation control system 101, comprising a first structure comprising at least one chamber 121; a second structure comprising at least one chamber 122, wherein one or more elastic elements 130, is interposed at the chamber of the second structure 122 and the chamber of the first structure 121, wherein the first structure 121, is moveably attached to the second structure 122, whereby a protected mass or PM 111 inertia vector transfer is transposed, deflected, dampened and dissipated and PM 121 is substantially isolated of an unprotected mass or UPM 112 vector transfer.

The present disclosure provides a device, capable in substantially isolating those forces contributing to occupant shock during a sudden acceleration episode. Forces typically experienced in a vessel, vehicle, bus or truck collision and acceleration ranges related to occupant safety, comfort and cargo protection in auto, rail, air and water transport vehicles.

Upon initiation of the embodiment, an unprotected or UPM vector transfer occurs where a configuration is qualified and manifests at the two masses PM 111 and UPM 112, and positioned by the embodiment to be non-concentric, in not sharing the same center or datum point. Thus, forming a linear relation, offset of the two masses, represented at their respective chambers, 121 and 122.

A PM inertia vector transfer delivers the PM to a predetermined path of isolated dissipation of the PM inertia, and isolation of the UPM vector. Noting the force transfer is isolated, occurring exclusively at the intersection of the two geometries. Sending a tangent circular movement among the chambers 121 and 122.

By way of example, in the case of a vehicle, if one chamber 122 is associated with the frame and body or vehicle chassis, being designated an unprotected mass, or UPM 112. And a corresponding chamber 121 associated with the seats, restraint system and occupant passenger, or otherwise optional designated protected mass, or PM 111. The relation of these elements can be provided as above, for an identical corresponding result.

For further clarity, by way of example, one embodiment of a CPS isolation control system is illustrated in FIGS. 1 and 2 in a pre-deployment state and at activation, respectively. The CPS isolation control system serves the protective management of the PM components such as occupants, seats, harnesses and the structural interconnection of the embodiment, versus the UPM components such as body and chassis, which serves the long standing role, as the sacrificial medium.

FIG. 1 illustrates a portion of an example CPS isolation control system 101 in a pre-deployment state. At the bottom of FIG. 1, a chamber plan view of chambers within a PM centered CPS isolation control system 101 is shown, and at the top of FIG. 1, a section view of the chambers of CPS isolation control system 101 is shown.

Here, the CPS isolation control system 101 features a concentric alignment of two mass types, a PM chamber 121 and a UPM chamber 122, represented with a common datum position. PM chamber 121 and UPM chamber 122 provide containment, tension and compression. The section view positions the elastic element storage 132 in a radial, or arc formed orientation, for deployment near the chamber 121 and 122 perimeters.

Figure 3:
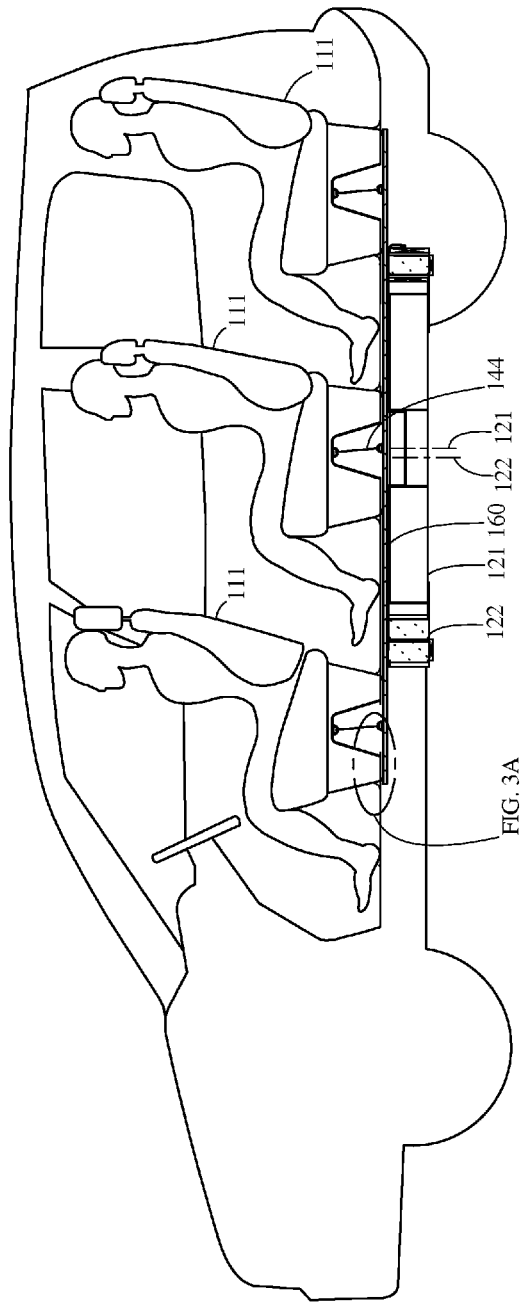
FIG. 3 illustrates an example of a CPS isolation control system in a vehicle.

FIGS. 2-3 Referring to the figures, for the purposes of illustrating embodiments of the invention, and not for the purpose of limiting the same,
embodiment of the CPS isolation control system is labeled 101 to include
a PM 111,
in suspension by PM suspension 144,
in connection with force transfer beam 118,
in connection with explosive head bolt 160,
a PM connection 142,
which may be a selective coupling to an unprotected mass, or UPM Chamber 122,
being proximally interposed to a suspended PM Chamber 121,
having an inner nonconcentric, and tangent bearing relation with a set of elastic elements 130, arranged in an inner nonconcentric and tangent bearing within a chamber 121 and/or 122, or chamber sets, and 122 being secured by an unprotected mass connection UPM 140 to the unprotected mass, UPM 112.

FIG. 2 illustrates a PM centered CPS isolation control system 101 at activation. As illustrated for the embodiment of CPS isolation control system 101, elastic element(s) 130 are initiated from elastic element storage 132 at activation. The activation of the elastic element(s) 130, displaces datum of the PM chamber 121, for an off-center relation with UPM chamber 122, as illustrated in the chamber plan view at the bottom figure of FIG. 2.

At activation, PM components are set in suspension and isolated from the UPM. Isolation of the PM components is accomplished through the severing of a connection member. For example, one or more explosive head bolts is sheared upon receipt of a signal from a controller. An example of a controller 800 is provided in FIG. 8.

FIG. 3 illustrates an example of a CPS isolation control system application within a vehicle, representing elements of the PM with the designation of 111, and PM chamber 121. Again, the UPM elements are generally associated with being connected to structural elements of the application, largely, the body and frame, identified UPM 112, and UPM chamber 122 of the embodiment. PM components are noted to be in suspension, via suspension 144, as the result of the embodiment being currently activated. Illustrating datum of the two chamber elements 121 and 122 being largely non-concentric, or offset, following release of explosive head bolt 160.

FIGS. 4-7 illustrate examples of how a UPM centered CPS isolation control system may be used in the transposition of a stochastic vector. In FIGS. 4-7, information regarding direction, position, speed, and mass characteristics, acceleration, and progression associated with an intruding force vector are identified concurrently with the PM and UPM characteristics. And further signaled by the sensors 168, for processing and determination by the ECU, electronic control unit 800, for activation of the CPS isolation control system 101. Upon activation, the PM is released from the UPM, in suspended state, thereby establishing isolation of the masses. By way of example, explosive head bolt 160 may be initiated to sever connection of the PM and the UPM. Following isolation, one or more elastic element 130 is initiated, interposing a path constructed of resistance disposing the PM chamber to a designated point, intersecting a point tangent with a UPM chamber, as directed by the ECU 800, for the given direction, location, speed, rate of acceleration, magnitude and attitudes of the vector. The PM is, as are all components of the vessel, subject to forces of acceleration from the direction of a vector, yet the PM is the exclusive recipient of the dampen suspension and isolation rendered by the embodiment. It is presently contemplated the elapsed time of the UPM vector, to the PM inertia vector transfers may be extended, by identifying an anticipated UPM point of vector transfer, at early system staging.

In further consideration, a PM inertia vector is disposed to travel opposing a linear vector, prior to any interference. Yet, upon vector transfer, an embodiment configuration, comprised of a set of chamber and elastic elements may be provided through an alignment of form and resistance, for directing a vector transfer to a preferred dissipation path. Again, referring to FIGS. 4-7, a vector path may be provided in alignment with a controlled contrast resistance point or distal formed points of an elastic element(s), being 90 degrees opposite the major resistance contained at midpoint of an elastic element(s). Where compression and resistance of the elastic element(s) may be initiated at a distal point, see FIG. 4.1 and 4.2. The configuration provides for an immediate tangent relation of the chambers at initiation of the system, following through vector transfer and its final dissipation. The configuration of form and resistance supports minimal disturbance of the chambers, as their alignment is isolated of dissonant forces and direction is committed to the vector influence.

Figure 4:
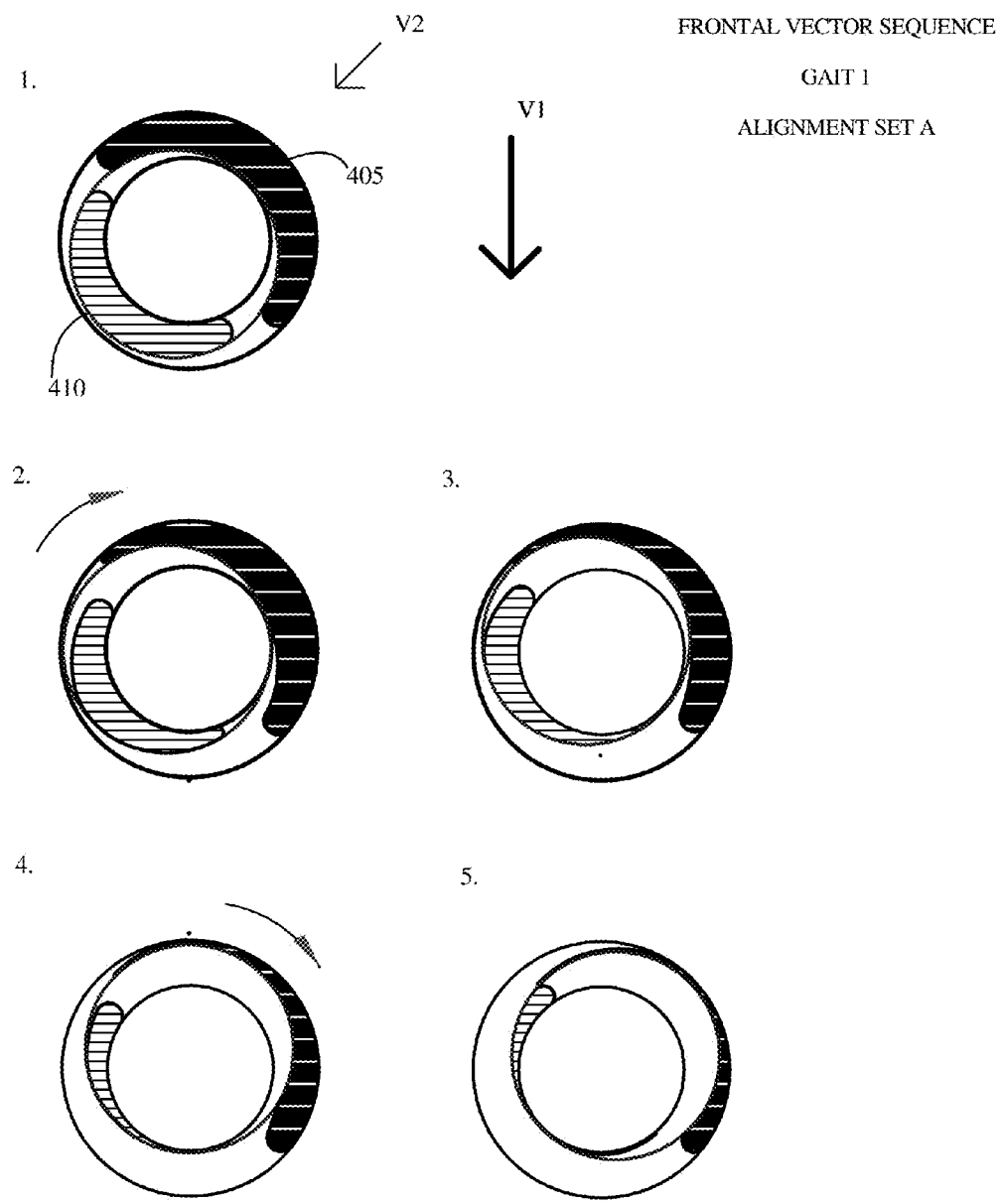
FIG. 4 illustrates an example of a UPM Centered CPS isolation control system, in response to a frontal impact force.

FIG. 4 illustrates an intrusion vector V1. As shown in 4.1 of FIG. 4, elastic element 405 and 410 are initiated in a direction indicated by vector V2. Inertia of the PM, including the PM chamber, causes tangent travel of the PM chamber within the UPM chamber, while compression of the elastic element resists force transfer, offering a selected magnitude, and modulated articulation featured dampening of the PM in an established path.

As shown in 4.2-4.5 of FIG. 4, the PM continues its clockwise path, as the elastic element 130 provides the ECU 800 specified value of vector deflection, dampen, dissipation and isolation properties. An active valve control facility may be used with pressure sensor information directed by the ECU, for the purpose of timing dampening, relative to the isolation status of the PM. Alternative dissipation control may be used, by way of example, weakened containment element, tears, heat responsive, passive or active piezoelectric and bimorph actuated resistance control as supplement, hybrid or standalone sources of dampening control.

Figure 5:
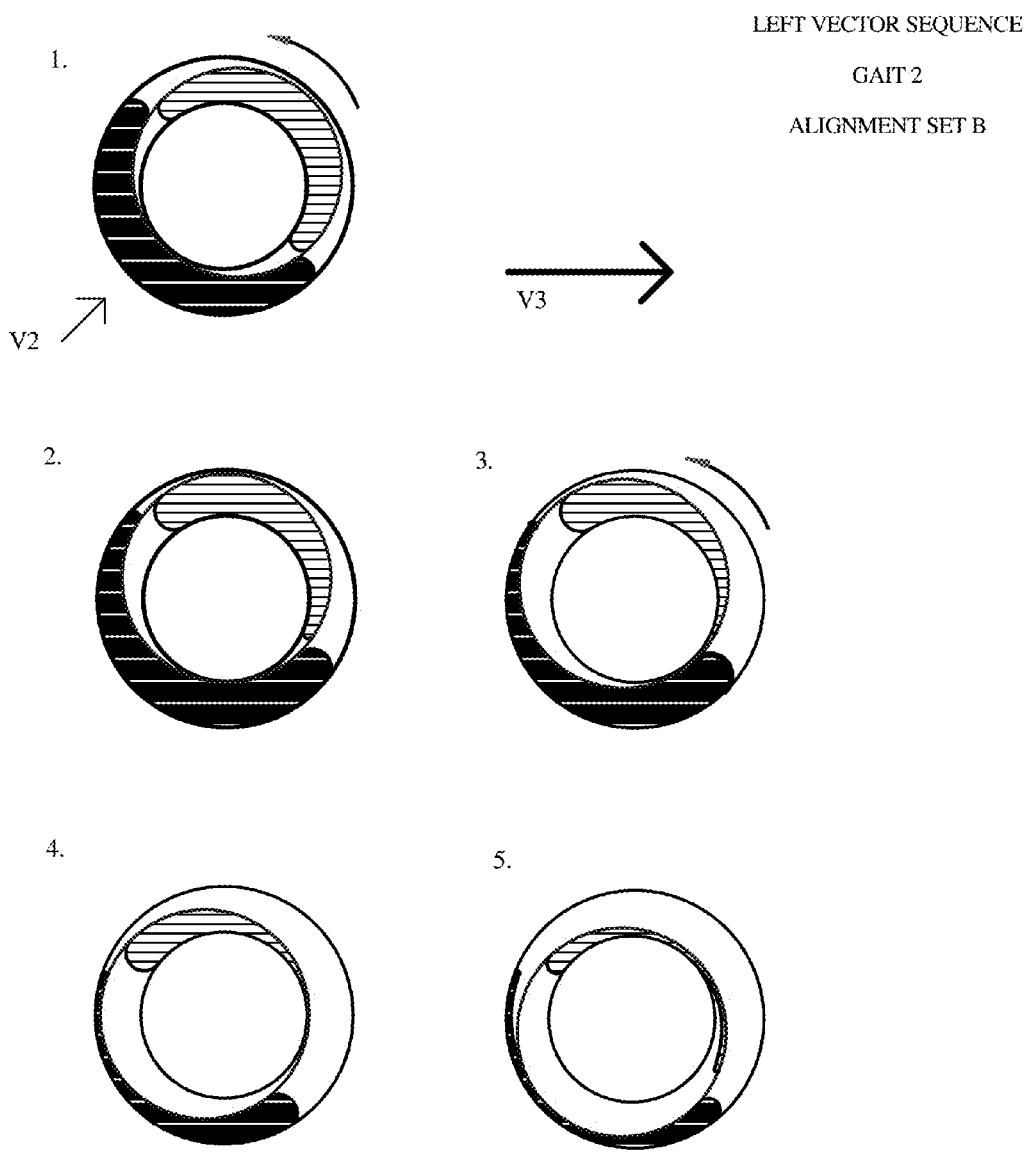
FIG. 5 illustrates an example of a UPM Centered CPS isolation control system, in response to a left side impact force.
Figure 6:
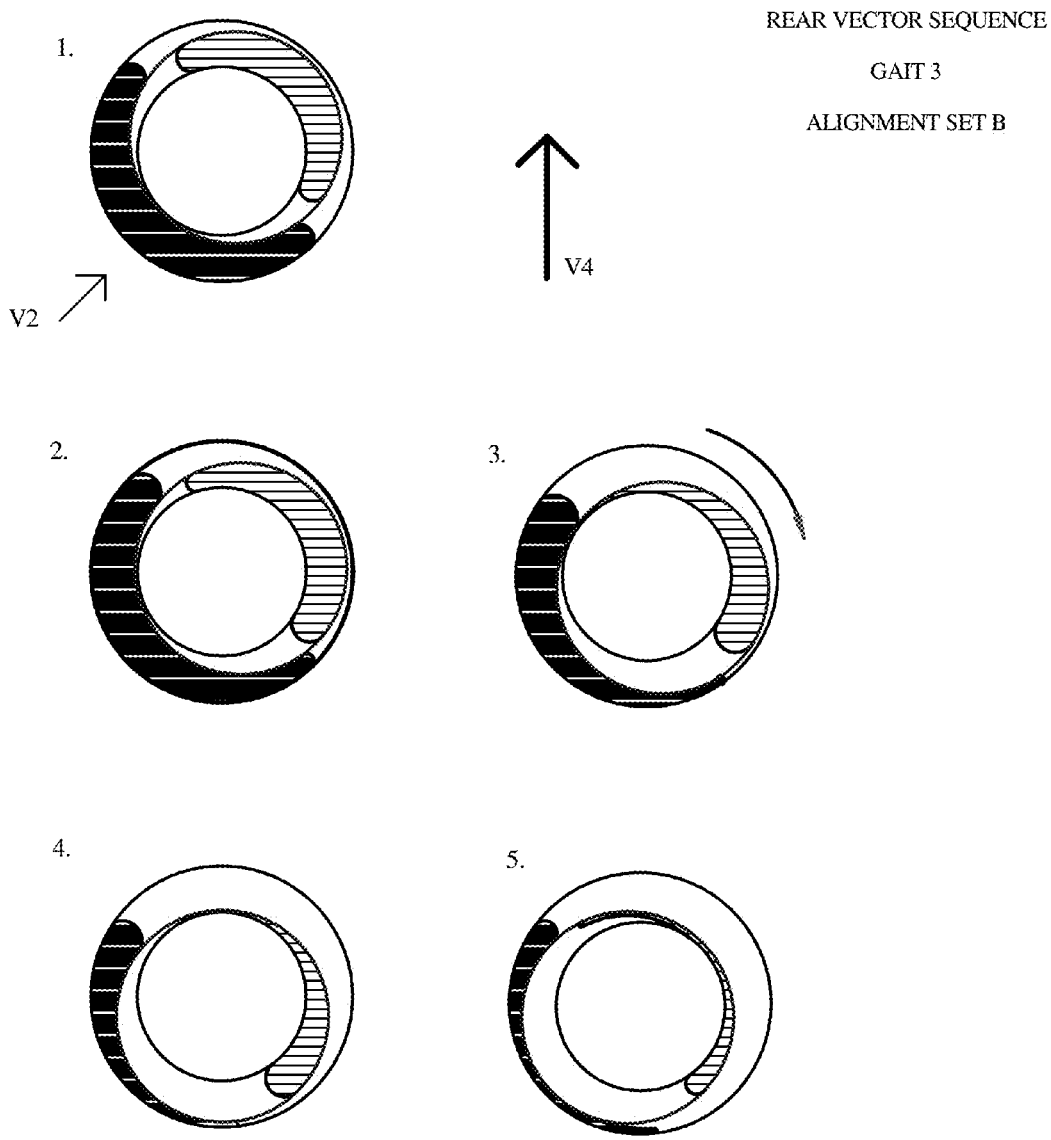
FIG. 6 illustrates an example of a UPM Centered CPS isolation control system, in response to a rear impact force.
Figure 7:
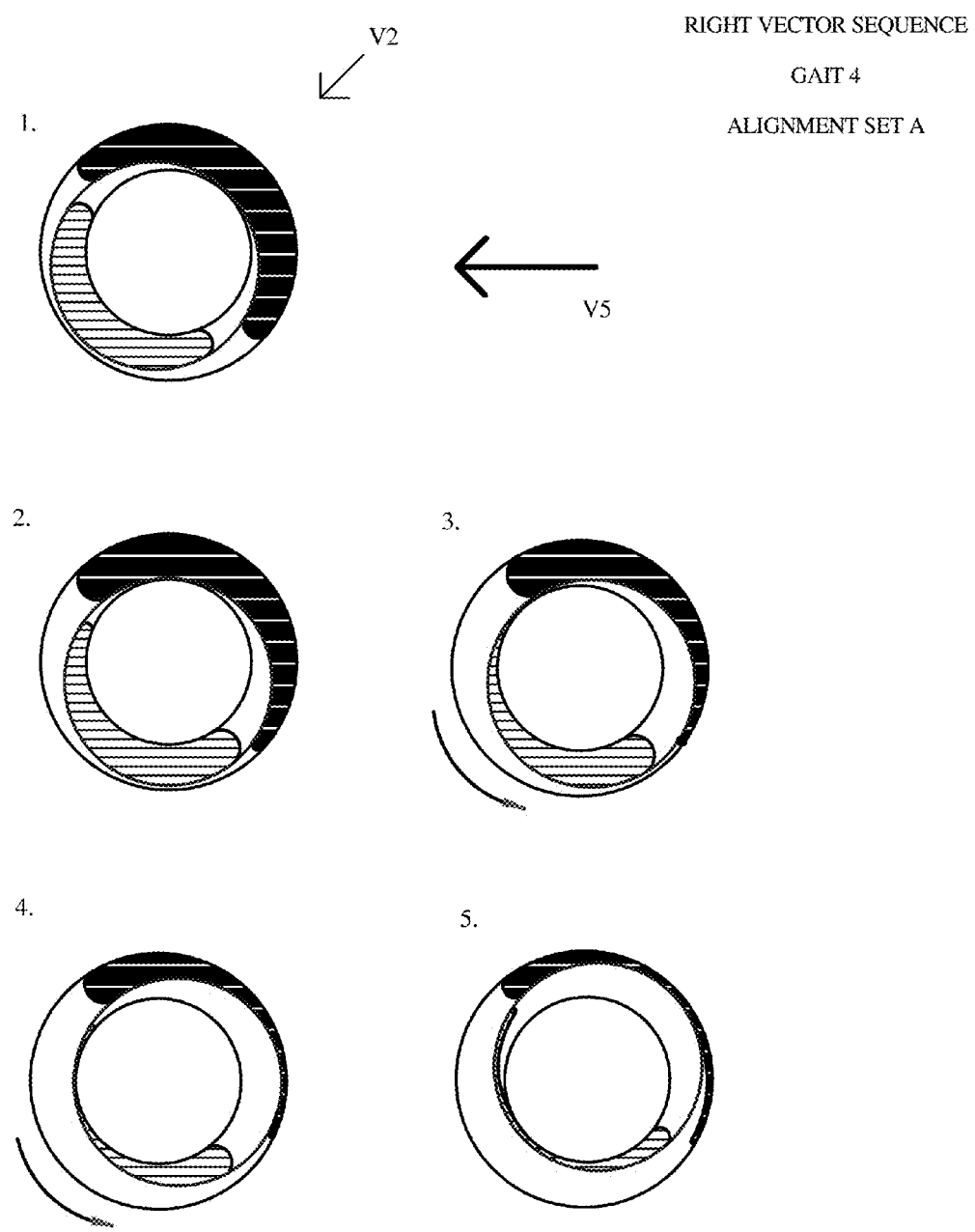
FIG. 7 illustrates an example of a UPM Centered CPS isolation control system, in response to a right side impact force.

FIGS. 5-7 are similar to FIG. 4, and show the elastic element and positioning of the PM 121 and UPM 122 chambers initiation for intrusion vectors V3-V5, respectively. Furthering by illustration, a phase change or shift of energy frequency, amplitude or time may exist in each, or in the relation of two masses. A selectively isolated configuration of a mass from an original mass is provided. And upon an inertia vector transfer, the transposition of a force vector to a centripetal path of dissipation is performed. Resulting in a phase change, or shift of energy acting upon the configuration.

Protection of the PM is extended to provide response to an intruding vector, based on its position in relation to the embodiment. The embodiment may use a system of sensors in detecting presence of an intruding vector attributes, for signal communication with an ECU 800. Upon detection, a projected point of vector transfer or current point of vector transfer is determined, and the association of a gait is established. A gait system for application of isolation, deflection and dissipation control is provided. The term gait, is defined as a configuration of embodiment elements qualified by attributes of the intruding vector. A graphic representation of chamber elements, in each of four gaits is provided in FIGS. 4-7, noting the illustrations render sequential characteristics of the embodiment. In further noting, the gait is a configuration provided to render a path of dissipation for the vector, in a means for isolating effects of the vector, as a result of positioning dampen elements in its predetermined path qualified by the vector. As illustrated, in FIGS. 4-7, Gaits 1 and 4 use a same set of embodiment element features contained in Alignment Set A. And in FIGS. 5 and 6, Gaits 2 and 3 use the same set of embodiment element features contained in Alignment Set B. Each alignment set features two directions of dissipation, providing a total of four gaits in this embodiment. The implementation of a gait is qualified by an intruding vector's point of vector transfer, relative to the embodiment datum, projected or physically identified. A further data input, comprising vector and mass characteristics of the intruding and embodiment associated mass, qualifies a set of dampen resistance values armed in the inertia disposed path of the PM. Providing a predetermined and substantially isolated configuration, where the structures direct, confine and define a protected dissipation path in an isolated alignment of the PM inertia vector, and the UPM vector at the chambers.

Figure 8:
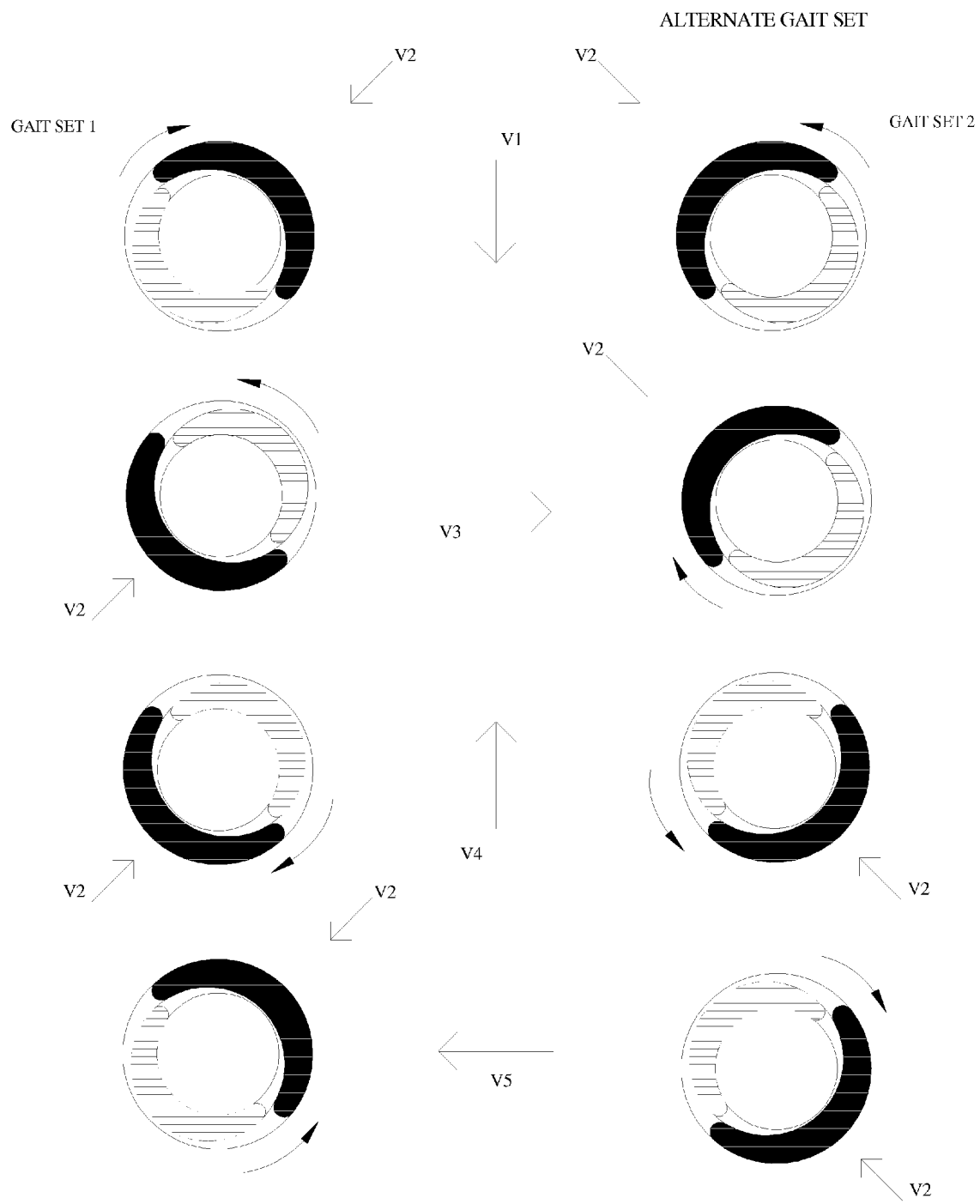
FIG. 8 illustrates gait sets 1 and 2 wherein 2 comprises an alternate gait set.
Figure 9:
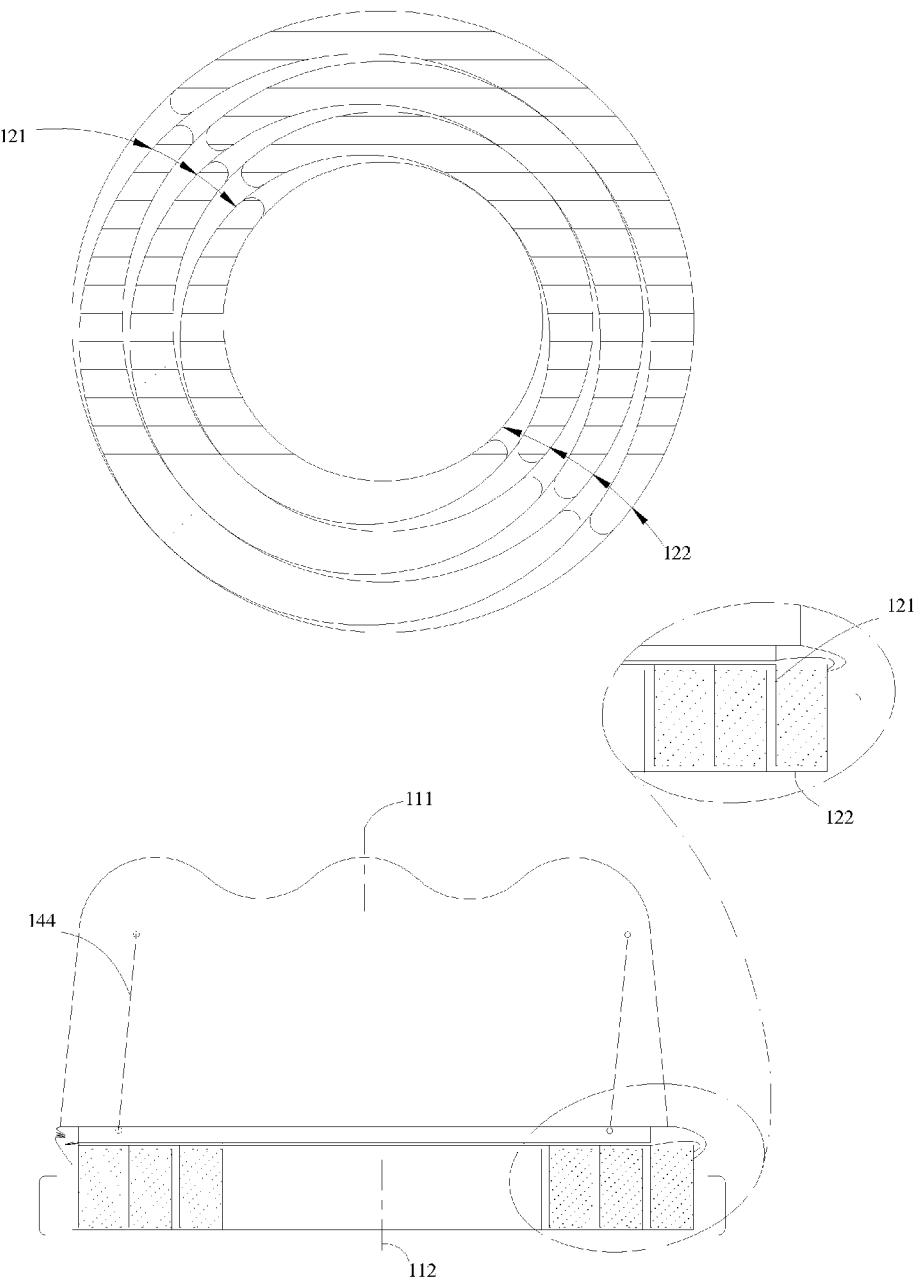
FIG. 9 illustrates a six chamber application of a UPM Centered embodiment in plan and in section of a bench seat.
Figure 10:
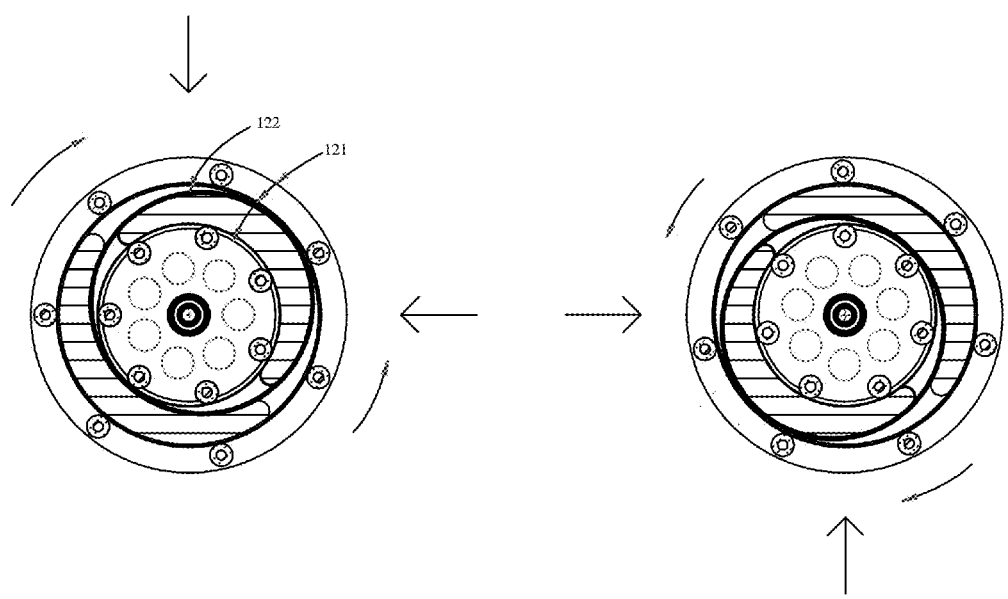
FIG. 10 illustrates a PM Centered application with bearings.
Figure 11:
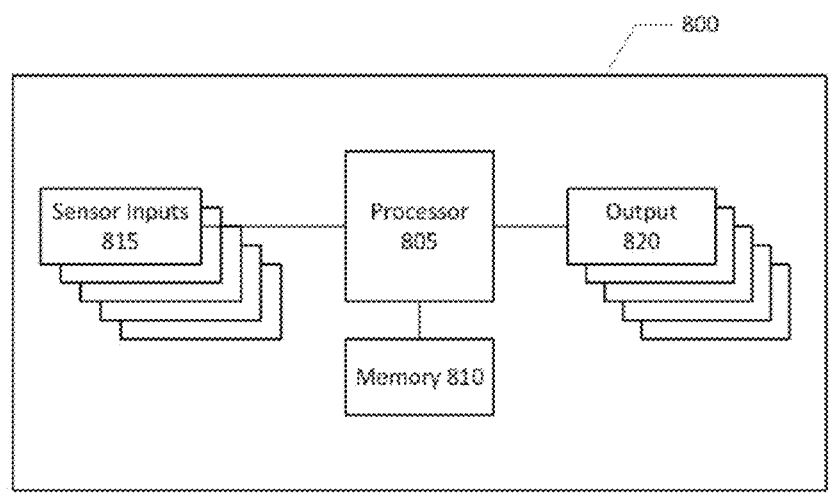
FIG. 11 illustrates an example of an electronic control unit (ECU).

As observed in FIGS. 4-8, at least one gait may be configured to each of the primary sectors of the vehicle, forward, rear, left and right sides, comprising an at least 360 degree composition of gaits, forming the active domain of the device. Concluding, a point of vector transfer is located at any point within a 360 degree origin of the embodiment. Further concluding for this embodiment, the PM is independently isolated in a total of two full directional degrees of freedom, forward and rear, left and right. And providing an independent configuration of elements for each directional component through the employment of an isolated dissipation path in a rotational degree of freedom. FIG. 8 illustrates a further set of UPM centered gaits, for employment in an alternate or as an added featured design. An approximate 180 degrees of active dissipation is provided each sector comprising a gait in this embodiment. Provided an embodiment employs an alternate set of gaits as a design option, a total of eight gaits furthers access to 1440 degrees of dissipative capability. Additionally, the re-initiation of a gait, elastic element or alternate elastic element set may be implemented for furthering dampen value to final dissipation, in a design option. It may also become apparent as a range of dissipation, magnitude of resistance in the elastic elements, the number of elastic elements, cells and sets, with their associated chamber elements, scale of the embodiment features, capabilities of reinitiating elastic elements and the chosen form of elastic elements, and combinations are features of magnitude and preference comprising the embodiment. FIG. 9 illustrates application of a UPM centered 6 chamber embodiment, and FIG. 10 features inner and outer bearings. It is yet expected the methods of implementing the required dampen, deflection and dissipation features of the embodiment, also have a bearing in its magnitude of effectiveness and efficiency. Wherein a wide range of isolation resources is available to address the economic, comfort, and preferred safety priorities per the environment of each application.

At activation, one set of the chambers can be connected to a chassis/frame and the other connected to the designated PM, as described above.

Having described an underlying concept for a CPS isolation control system, the following describes a control system for controlling and activation of the CPS isolation control system.

The proceeding illustrations promote clarification of the ECU 800 role, in identifying and applying largely optimal resistance rates of the elastic element(s) 130 to the PM chamber 121, for conversion of the PM inertia to heat and dissipation. The word optimal is used in context of employing tactful response, in recognition of priority for tasks or demands involved, for the most auspicious solution. By way of example, the rate of acceleration, or g's, versus biological data, versus the rate of resistance required for full dissipation, versus quantity of resistance available at select rates for the existing mass inertia, versus tested capabilities of system performance. It is expected the synthesis of data will work a prioritized best solution, within capable bounds of the embodiment design.

FIG. 8 illustrates an ECU 800 for control and execution of the CPS isolation control system. ECU 800 includes a processor 805, a memory 810, one or more sensor inputs 815, and one or more outputs 820. ECU 800 may be implemented separately or as part of another control unit, such as an auxiliary control unit.

Processor 805 may be any device or combination of devices that executes instructions, where the instructions may be hard coded or soft coded, or a combination of hard and soft coded. For example, processor 805 may be, or may include, a microprocessor, microcontroller, digital signal processor, field programmable gate array (FPGA), application-specific integrated circuit (ASIC), or direct memory access (DMA) unit. For soft coded instructions, processor 805 may read instructions from memory 810.

Memory 810 may include volatile and nonvolatile memory sections or structures. For example, memory 810 may be implemented as a volatile random access memory (RAM) semiconductor integrated circuit in combination with a flash memory integrated circuit. Portions or all of memory 810 may be included in processor 805.

Sensor inputs 815 receive data from sensors. For example, sensor inputs 815 may receive data such as ambient light intensity, temperature, pressure, and humidity. Other examples include sensor inputs 815 for pre-impact presence or distance sensors such as radar or LIDAR (light detection and ranging) sensors, commonly referred to as "anticipatory crash sensors", featuring mass characteristics detection and identification libraries, for pre-impact data. It is presently contemplated the elapsed time of the UPM vector, to the PM inertia vector transfers may be extended, by identifying an anticipated UPM point of vector transfer, at early identification or early staging of the system. Yet other examples include sensor inputs 815 for PM, UPM, and/or vehicle status sensors such as position, speed, velocity, acceleration, yaw, pitch, roll, direction, occupant weight, pressure, force, vector datum and status, fluid level, pressure, brake engagement, and engine or transmission torque. Sensor associated data 815 may be stored in memory 810.

Processor 805 monitors the PM, UPM, and/or the vehicle and its occupants by analyzing data from sensor inputs 815. Processor 805 may also monitor nearby vehicles by analyzing data from sensor inputs 815. Processor 805 may determine the anticipated and concurrent force vector source and intrusion characteristics, and may provide a signal to an output 820 initiating a response of one or more signal receivers of the embodiment in the vehicle.

Output 820 may be one or more drive circuits or drive devices providing voltage, current, or frequency to an external device upon receiving a signal from the processor. For example, output 820 may be a field effect transistor (FET) that is switched on by processor 805 to provide a signal to an elastic element, valve, actuator, hybrid or sets for arrangement of force transfer elements.

ECU 800 may determine the approximate point of impact to the vehicle, and/or the direction and magnitude of forces at the impact point. It is presently contemplated the elapsed time of the UPM vector, to the PM inertia vector transfers may be extended, by identifying an anticipated UPM point of vector transfer, at early identification or early staging of the system. Using such information, ECU 800 may initiate a sequence of any variety of PM responses. By way of example, multiple force transfer components associated with a vector containment chamber set, may be sequentially initiated. For another example, processor 805 may select alternate resistance configuration between sequences of initiating multiple elastic element(s), from an optional alternate elastic element set, or re-initiation of an elastic element set.

ECU 800 may determine the status of chamber 121, 122 and elastic element 130 forces, from local and alternatively located sensor inputs. Accordingly, ECU 800 may initiate a sequence of responses, or sequentially initiate single responses, based on an array of sensor, program and library data input.

ECU 800 may manage physiological stress profiles, sudden acceleration event histories, and mass identification data stored in memory 810, for processor 805 to command a response using the most efficient resolve of the event, in minimizing shock, trauma and/or discomfort of the occupants.

ECU 800 may manage monitoring a relationship of the PM to the UPM, recognized as the angle of incidence of the two masses, occurring in the chambers during the course of an acceleration event. A sensor or sensor set is provided proximal to the chambers, in communication with the ECU or processor, providing status of this relationship. Variations of the measurement result from effects of the stochastic vector magnitude, acceleration, length and frequency upon the elastic element(s). The PM and valve positioning, valve articulation, dissipation rate, and the method of dampen isolation may also contribute to variation in the angle of incidence. Providing for an immediate measured relation of the PM to the UPM, for an additional data available prior, during and following the dissipation cycle.

The embodiment and its configuration provides a design facility. Selectively extending protection beyond occupants to cargo, interior planes of the cabin, floor, ceiling, designated compartment(s), a whole cabin or most any set of elements may be determined by the OEM for a particular vessel design. It may be preferred, a set of elements be qualified by the degree of physical protection available from intrusion, during an acceleration event. By way of example, referring to FIG. 3, a set of PM, comprising the seats and their interconnection to the embodiment near a center axis of the vehicle provides a protection from physical interference.

Control units, memory, processors and sensor hardware, software and programs are available on the shelf from manufacturing vendors. Programming and hardware systems are immediately available in the present art, from vendors of the automotive oriented and other markets suited for addressing and implementing the accelerated dynamics and responsibilities inherent of the embodiment role.

In consideration of the materials for fabrication of the embodiment.

The torus-like, toroidal form and structural demands of chambers 121 and 122 are conducive to application by many materials. Metals are suitable for the embodiment from molded, pressed, stamped, cast, tubular, plate or sheet of steels or aluminum alloys, in lamination, composite, or composite formed hybrid materials and honeycomb, oven braze, weld and most methods of metal forming and joining can satisfy purposes of an experimental prototype.

It is expected, as a result of the recent 54.5 mpg standards, the industry will be in permanent demand of high strength to weight materials. Composites of glass and/or fiber of carbon, carbon fiber reinforced nylon, aramid and others are commonly used for structural applications, as it is to be anticipated for the embodiment also. An S glass may be preferred for economy with hybrid reinforcing.

Varieties of synthetic rubbers, plastics and films are available as the primary containment body material of the elastic element 130. Weave, patterning, lamination and composition of body material may vary, in consideration of economy, performance, structural demand, size or form of each elastic element. Nylon, carbon, aramid and glass fibers and metals serve as elastic element structural reinforcement components in many similar products. Surface texturing of the elastic element, or its contact surface areas may be adjusted. The application of PTFE or other polymer lubricant and/or protective barrier to the elastic element, or its contact surfaces may be required before a satisfactory frictional co-efficient or strength is established. Presently, high strength and heat resistant properties found in polyarletherketones, and other high performance polymer films promoted by those of the art in the marketplace are anticipated.

The elastic element is also largely cylindrical in shape and serves high structural demands, plus optional requirements of flexibility. Varying properties of elasticity are expected, as diverse design properties are sought. The elastic properties required of the embodiment may be derived from the relation of the element properties contained within the walls, to the properties of a containment element 130, or in combination. By way of example, a flexible non-elastic containment element 130, in conjunction with a visco-elastic fluid. Where the fluid provides the source of dampen, dissipation and elasticity. Though the active means of control through valves is anticipated for each elastic element as a unit, or as a plurality of cells. In contrast, 130 may be frangible or elastic, in single or composition of a solid, woven, composite, fiber, film, or interlayments of material, or hybrid materials, properties and/or methods. And, may vary by its means of active or passive activation, form, composition, performance and range of material properties within a same embodiment or application.

In addressing mass manufacture of the PM and UPM chambers. Their shape has a noted circular component, conducive to using robotic, high speed automation, in a precise fabrication process. Filament winding is used to derive economic, weight and strength benefits available to the OEM and consumer, in products of similar form. The process uses low cost materials, yarn rather than fabric, less material and waste, with less labor, handling and transport costs than many other forms of component manufacturing. A closed press is a likely and well established method of intermediate, or final forming of the structure. Thermoplastics may also be considered.

The automotive safety application of the embodiment addresses immediate concerns of vehicle occupants. The recent increased CAFÉ standards stultify conventional efforts in employing acceptable means of dissipating the transfer of shock during a severe collision. The new standards mandate the industry design to minimize available mass, traditionally used for protection and dissipative means. Vehicles must conform to the new 54.5 MPG standard with expectation, for more expensive and unsafe vehicles, causing millions to leave the new car market, and substantial increases in death and injury.

Conventionally speaking, the answer to shielding the occupant during a sudden acceleration event is to secure him to the two or three tons of mass, and place a few cushions between him and the mass. This may prevent him from ricocheting off the interior, or going through the windshield. Its commonly understood, those forces can stress the occupant, harness and seat in a multitude of directions, to a fractious outcome.

The arts continue to employ extensive efforts in identifying the position of passengers, for qualifying the deployment of airbags, recognizing the possible negative consequences of airbag contact, for an occupant out of acceptable positioning.

Even the most aggressive protection designs in occupant airbags, provide little or questionable means of force deflection. Requiring the body and airbag to assimilate large scale acceleration forces immediately upon impact. Yet, with no means of directing containment of deflected forces, deflection may not be realistic for the airbag in its present embodiment. The roughly thirty percent who are saved as a result, can be thankful for the present state of technology.

A prominent patent author discusses teachings of aspirators, nozzle design, inflators, propellants and gasses, in a sober critiquing of the art, exposing a several decade history of limitation and concludes with this candid, serious statement, "toxic gasses, and their use becomes practical." Referring to toxic gas, being used inside vehicle airbags. And 'practical', in the context of it being an acceptable and necessary choice, with the requisite for even further dependence on gadgetry, for dealing with it.

The conventional deployment of an airbag may be caused by the force of a collision, deflecting the vehicle to a dangerous course, requiring the control of a blinded driver. This setting type permits senseless endangerment of all vehicle occupants and our communities. Blinding the driver and sacrificing his control of the vehicle may no longer be justified in many cases. Implementation of the embodiment does not contribute to obstructing driver view.

Until now, all occupants, including the driver have been secured directly to the vehicle frame/chassis, for the sake of arbitrary control, with a limited benefit. Subjecting them to every shock transmitted through the frame and body, while absent substantial isolation means from a direct overwhelming stochastic acceleration. Contemporary restraint devices are largely limited to shielding the occupant, from intersection with the interior mass. And, not the forces transmitted. This setting is dangerous in transmitting severe shock to the occupants contributing to the likelihood of the driver being unable to retain control of himself, much less the vehicle.

The magnitude of shock occupants are subject, during an acceleration episode is not commonly regarded, much less understood. In most any instance, occupants have no control of their bodies, even when initially secured by a safety belt. In the embodiment, objects designated PM, or protected mass, are not directly connected to the frame, body or chassis. In isolation, they are subject to the product of their collective mass in inertia, in the dissipative effects of the embodiment, as the vehicle is isolated to dissipate its own vector transfer, substantially separate of the occupants and PM.

User constraints, common to airbags are not foreseen in the embodiment, for the simple reason, no occupant contact, sight or interface with the embodiment occurs, except in the invisible mitigation of force transfer. It is expected the occupant will never see a component of the embodiment, before, during or following its deployment. As it is preferred and provided here, all components require mechanical dismantling for their exposure.

The successful deployment of the embodiment is not dependent upon a specific body position or timing of occupants, nor is it subject to an interruption of protection, as is the case for air bags, knee absorbers and other protective devices. The embodiment allows for optimal distribution of restraint to less sensitive areas of the body, as opposed to airbags. And, as a result, does not restrict the restraint design to chaotic scenarios of body mechanics, for potential subjective interpretation. Occupant protection, primarily requires the proper use of a safety harness or preferred inflation restraint, minimal intrusion of the passenger compartment and arrangement of elements as discussed in the embodiment.

The embodiments are not dependent upon the occupants' interior or cabin air, as a required resource for their proper function or use. Nor is there any contribution to the deterioration of interior air quality, as the unit is remotely located. If the embodiment is placed in close proximity, it may be conveniently sealed from affecting interior air. Nor does a deployment require the displacement of interior air, resulting in an internal pressurization of the vessel cabin to pop open doors during an incident, further endangering occupants, as OEM's have historically been concerned with, in occupant protection means.

For purposes of introduction clarity, elements of the PM are not restricted to those graphics or descriptions contained here. The PM is composed of those elements or set(s) desired at design of the system. By way of example, interior components, cargo storage area, floor, seating, dash, occupant restraining device, ceiling, or any element sought, for protection from impact forces. A vehicle may comprise a cargo designated area with the facility to secure wheelchair and occupants to the PM. And likewise, caged or otherwise secured pets may be afforded protection of the PM. And further, by way of example, a whole cabin or cargo assembly configuration of a vessel may be allocated PM.

Embodiments discussed here, also support alternative vehicle design approaches in vehicle safety. One example addresses the commonly employed concept of a safety crunch zone; a design of materials composing the protective envelope for vehicle occupants, used for energy transfer and dissipation to decomposition in a sudden acceleration episode, thereby providing a degree of protection to the occupants, by dissipation of force.

In contrast, the embodiment design may be driven to accommodate force transfer rates at many points on the stress curve, potentially including the forces of initial impact through final dissipation, depending on design priority. Minimizing the need for sourcing inertia based force dissipation. This capability provides manufacturers the opportunity to strengthen the surrounding protective envelope of vehicle occupants, rather than weaken it. Rather than allocating mass for dissipation, using mass for structural integrity of the vehicle.

By way of example, a vehicle door may currently be designed, using the mass to absorb and dissipate impact at a low stress point, rather than high resistance to decomposition. The result being, a prescribed dissipative value, leading to possible intrusion of the protective envelope and likely injury of the passenger at comparatively low impact. Whereas, the embodiment provides the majority of force protection and isolation for the protected mass. It can serve as a primary dissipation source by the OEM designers and others, in minimizing the dependency of vector dissipation being sourced from the chassis protective envelope. The vehicle retains more structural integrity through a hardened design, for furthering protection of its occupants. And, further results in the added benefit of a mass preserved for latter stage dissipation, if needed.

The reader may have determined, the embodiment is not restricted to providing protection for the occupants to one direction. The embodiment provides access of 360 degrees of stochastic force protection of the vessel occupants, including their seating and restraint, and other mass secured to the vessel occupant seating, or designated PM. The scenario of forces in a conventional acceleration episode, recognizes minimal isolation of shock transfer through the safety belt and occupant seat. The seat and belt are subject to full shock transfer. Simply stated, those elements are PM in the embodiment. This benefit is foreign to any previous occupant mindset and thereby the author finds difficult to overstate. The PM remains more substantially independent, subject to its own inertia as the force is dissipated. Substantial isolation and dissipation of secondary forces, may further intercede displacement of occupants and their restraint, providing a setting unrealized in the industry.

Regardless of impact direction, the configuration minimizes exposure of direct force transfer to the PM, as the relationship of intersecting masses deflects and dissipates energy transfer during the directed travel of the PM. Whereas conventional methods offer limited management of shock transfer to a linear instant, primarily of one direction. The embodiment provides further opportunities of control, foreign to the design, manufacture, safety, and insurance related industries, to the benefit of the consumer. The embodiment provides a format of control, permitting determination of when to initiate or reinitiate a resistance dampen force, its direction, length, magnitude and modulation characteristics, qualified by attributes of the sudden acceleration event and data library.

A comprehensive perspective of the embodiment application is required before its full benefits can be actualized. The PM elements remain secured from intrusion by physical structural means. In the event a 'soft dissipation envelope' is employed in the vessel structural design, by way of example, intrusion of a vehicle through a 'soft' cabin door, or non-reinforced frame, may permit an intruding vehicle bumper. More specifically, the PM is in free lateral suspension, and requires the freedom to associate. Consideration of PM proximity to interior items, frame and door strength are design issues to be identified and prioritized.

Recognition of the embodiment purpose as a dissipation and isolation tool, having one principal preference of its placement within the confines of a vehicle frame is only logical. A space being employed by a small percentage of vehicles concedes a minimal sacrifice of design priority for its application.

The device of the present disclosure is applicable to embodiments in vessels of transport, or facility where a free association dampen, deflection and dissipation is sought for isolation control. In one embodiment therefore, a CPS isolation control system, comprises a first structure configuration, of a protected mass or PM, comprising a PM chamber. And, a second structure configuration of an unprotected mass or UPM, comprising a UPM chamber. A moveable attachment of the PM to the UPM is provided. And an elastic element is configured to interpose elastic properties at the PM and UPM chambers, and a sensor provided for signal communication with an ECU, in further signal with the elastic element and a selective attachment of the PM to the UPM. Thus, a free association of the PM is established, and positioned to a predetermined attitude for reception of a vector transfer, following signal of the ECU initiating the system. The PM is subjected to its own inertia, in a format isolated of the UPM, traveling a deflected dissipation path in a measured and modulated dampen resistance selected of the ECU. Isolation and dissipation of a vector is performed in three degrees of freedom, in the embodiment datum as described here. The result of a vector management facility employing a plurality of directional deflection, dampen, isolation and dissipation facilities.

In some embodiments, the sum of PM and UPM chambers may be greater than two.

In some embodiments, the device comprises an elastic element between each chamber and each adjacent chamber. Being toroidal, and disposing alignment of the structures to form an osculatory configuration of the chambers. The configuration is controlled by an ECU in response to an intruding vector, the PM mass characteristics plus dampening of the chambers. The elastic element form(s) remain toroidal throughout the cycle of initiation to final dissipation. It is noted, an elastic element form may be a constituent part, or a whole elastic element form. However, configurations of the chamber and elastic elements are not restricted to the representations provided here. As their location and form may vary by orientation, placement in the chamber, size and number, as designed for a dampen, dissipation and initiation methods or means. In recognizing the scale of diversity in vehicle use, requirements of the device are diverse in the range of a mass scale being protected, the degree of protection, the physical allocated area of the embodiment, and further method or design priorities. An arrangement of elastic elements may comprise a radial or linear sector configuration, for a sequential or monolithic, full or partial dissipation within a sector. The scope of a sector is defined by each embodiment. A sector may comprise association with one or more directional degrees of freedom. And yet, in some embodiments, a recurrence of dampen force is provided in a sector, as additional dissipation and isolation means, providing further alacrity in lengthening the dissipation time frame and further obviating stress to the PM. This recurrence may be provided in series, sequentially or monolithic, in any number of times or cycles, implemented in uniformity or non-uniformity, from a method order determined by the ECU.

In some embodiments the elastic element may be a composition of elastic elements comprising an actuator as required.

In some embodiments, each elastic element is in contact with both adjacent chambers, and further, some embodiments may have each elastic element disposed at the opposite direction, within the chamber, relative to the adjacent elastic element.

A preferred embodiment may have a transfer of early stage dissipation gasses to elastic elements of an alternate alignment or other supplemental set of elastic elements staged for later dissipation, serving as the sole or contributing charging force.

In some embodiments, the distance between the center of the chambers of the first structure and the center of the chamber of the second structure is greater than 7% or 10% of the chamber diameter.

Also provided, in some embodiments, is a vehicle comprising the CPS isolation control system, wherein the first structure is affixed to the body or frame of the vehicle. And the second structure is affixed to a seat in the vehicle, and wherein the greater proportion of volume at a two dimensional plane section of the chamber areas, is viewed horizontal, or in plan.

In some embodiments, the device is configured such that upon initiation of the system, the position of the chambers is nonconcentric, being oriented differently to the observer, as viewed from each side of the vehicle.

In some embodiments, the isolation control device comprises an elastic element, interposing a set of chambers. And, those chambers being disposed to a point tangent an opposing mass chamber, in an origin opposing the elastic element. A vector path may be provided in alignment with distal points of the elastic element(s), being 90 degrees opposite the major resistance contained at midpoint of the elastic element(s). The configuration provides for an immediate tangent relation of the chambers at initiation of the system at vector transfer, and following through to final dissipation of the vector. The configuration of form and resistance supports minimal disturbance of the chambers, as their alignment is isolated of dissonant forces and in a direction committed to the vector influence.

And in addition to the above, a vector path is provided in some embodiments, or electively influenced, by configuration of resistance values prepared in the elastic element(s), by the ECU or otherwise, corresponding to the preferred dissipation path. A distal point, edge, or structural value and form changes of the elastic element(s) may also serve in the embodiment as a resistance value influence, independent, or in association with other resistance value manipulation performed in the elastic element. Providing resistance value contrasts at segments or cells to exist in the elastic element with, and without the presence of an active valve control facility.

In some embodiments, the set of all vehicle, cargo and occupant elements are prescribed or designated to one of two subsets, as a protected mass, PM, or unprotected mass UPM. An isolation control device, comprising an assembly of respective chamber elements, is operatively connected to an associated PM and UPM of a vehicle. An exploding head bolt or an alternative disconnection facility is in signal communication at the activation of the device. In result, the PM is isolated from the effects of the UPM. The dampen elastic elements respond to the gait activation, configuring the chamber elements for reception of the intruding vector, based on the vector data. A vector transfer is performed, transposing the linear inertia vector to follow the contained, deflection, dampen and dissipation path of the chambers, in isolation of the UPM vector.

Protection from forces during sudden acceleration is not limited to occupants in a seat configuration. Some embodiments extend protection to any mass of the PM designated set, as identified by the OEM or designer. Configuration of the embodiment may provide isolation of any mass associated with the vehicle, containing a stable dimensional relation and connection with the PM chamber while independent interference of the vehicle UPM or other mass. Protection of the PM elements from interference of its free-associative isolation is required for proper functioning of the embodiment.

A CPS isolation control system method entails a vehicle and CPS isolation control system be provided, and classifying objects of mass associated with the vehicle into two classifications. Identifying those objects to receive protection, as protected mass or PM, and objects otherwise as unprotected, or UPM. Sequentially, providing information, such as identifying the speed, acceleration, mass characteristics, direction and position of an intruding vector relative to the vehicle. Including any ramifications of its presence upon the vehicle. Also, a set of current vector and mass characteristics present in the vehicle and embodiment, including the PM weight and force activity, plus any protected occupant or cargo data influencing performance of the embodiment may also be provided. An isolation of the PM is then established at its disconnection with the UPM, providing its lateral free-association. Providing for an alignment of the PM elements conforming to a prescribed, qualified gait or position, determined by the ECU 800. A vector transfer is performed, influencing direction of the PM in its protected dissipation path, where a measured dampen resistance and dissipation is performed.

The CPS isolation control system and method will further comprise, providing signal communication of the controller to the actuators, elastic elements or valves associated with the determined gait. Causing the elastic elements to be armed with the prescribed resistance value(s), based on the sequence timing(s), dissipation rate(s), processed and stored data, accessed by the ECU. Thus, the PM is positioned for vector influence. And upon PM vector transfer, inertia vector transfer, immediate initiation of a vector transposition manifests through a rotary transmission, deflecting the linear or stochastic vector to a contained dissipative format, managing the direction, path, dampen and dissipation rate of the PM, while isolated from effects of the UPM.

In furthering the isolation control system method a continuing sensor signal of the concurrent vector, UPM and PM status' is delivered to the ECU following initiation of the CPS isolation control system. A preferred set of vector dampen values is provided with a prescribed method in timing based on the updated system status and database contrasts or determinations. Where a modified or alternate dampen isolation is delivered through the embodiment adjusting for real-time conditions of the incident.

The CPS isolation control system method may include a modulation of resistance delivered through the elastic elements by the ECU. And a method may also include re-initiating the gait system, at least one additional time, in part, or whole, by direction of the ECU 800, in result of a sensor signal of the vehicle or embodiment status. A refresh of resistance value in the elastic elements may be required, in providing a satisfactory dampen status to maintain isolation.

The CPS isolation control system method may further comprise re-initiating elastic element(s), at least one additional time, in part, or whole, by direction of the ECU 800, in result of sensor signals of the vehicle or embodiment status. The frequency of re-initiating the elastic element(s) can be employed as an oscillation of resistance force and direction delivered the PM, regardless of the percentage of displacement of its position, or form to effect an acceleration of dissipation. Any desired dissipation rate or method will vary according to the vector load and status of the PM.

A CPS isolation control system and method may provide on-going protection during the course of vector transfer and dissipation by providing continual sensor communication, in monitoring concurrent vector, vessel and embodiment status for signal to the controller. And further providing for an adjusted set of dampen values or method(s). By way of example, a sequential resistance timing delivery, or a simultaneous system refresh of resistance values is delivered to the sector chambers, based on the derived status' and system database contrasts. And, by further example, the prediction by sensor of an additional vector influence, requiring an alternate gait, during or following a present initiation also requires determination by the ECU. Modified or alternate dampen methods are anticipated to be delivered through the embodiment, in adjusting for real-time conditions of an incident.

Alternative embodiments include a system with:
- at least one elastic element or vector transfer control element.
- at least one division of an elastic element, providing at least 2 cells contained about an elastic element.
- at least one elastic element or cell, having at least one valve control element or feature, being passively controlled, without signal from a controller, monitor or sensor.
- at least one elastic element or cell, having at least one valve control element or feature, in signal communication with a controller, monitoring or sensor device.
- at least one elastic element or cell, having at least one valve control element, or feature to provide release, and or transfer of an hydraulic force transfer medium, independent of other elastic element or cell.
- at least one elastic element or cell, having at least one valve control element, or feature to provide sequential release, or otherwise, and transfer of an hydraulic medium, for contribution to a circuit, reservoir, cell or elastic element.
- at least one integrally formed elastic element or set, including, by way of example: A backing, or similar modular, or integrating body element, providing position, containment and/or attachment features, for the efficient placement of elastic element(s) and associated sensor (s), valve(s), signal transmission and/or select embodiment hardware, in whole, or for each designed segment, prior, during and/or following installation. Thus, a modular installation and/or removal, selective configuration facility, enabling efficient modification, repair or maintenance.

Alternative embodiments further include a system that employs:

A hybrid or combination, gear or gears, cam or cams, hydraulic set of force transfer agents and/or elastic elements in conjunction with:
- an epicyclic assembly of gears.
- a rotary dampen device.
- a rodless or cable cylinder dampen device.
- a torsional force transfer device with hydraulic chamber.
- a piston lug cylinder.

Alternative embodiments further include a system that is configured with:
- Integrally formed elastic elements fitted within the chamber elements for enhanced delivery efficiency and stability in element chamber positioning.
- A detachable elastic element storage containment system, including delivery actuation fittings and hardware.
- Chamber elements enabling performance in one to six degrees of freedom, inclusive, for applications in aviation, seismic isolation of buildings, civil engineering infrastructures and acceleration ranges related to occupant safety, comfort and cargo protection of train, auto, air and water transports.

Alternative embodiments further include a system employing or performs a modified period characteristic of a pendulum, or that employs:
- a foreshortened pendulum suspension, configuring the suspension length of one or more legs to approximately equal, or correlate to the distance from a pendulum axis, to a plane, representing a selected stroke distance of an elastic element. At full extension, the configuration may require the suspended mass, PM, to transfer an approximate maximum force value of an elastic element stroke, expressly while being elevated or extended 90 degrees, or a chosen point from its rest position.
- an unstable pendulum suspension.
- at least one fixed plane lateral suspension.
- at least one pendulum fixed plane suspension.
- at least one suspension pendulum.
- means of providing a free associative suspension.

Alternate embodiments may include increased segmentation or numbers of sectors, chambers and/or elastic elements of a poloidal, toroidal or radial coordinate.

Alternative embodiments further include a system with two or more, in number of an approximate embodiment, featuring coordination of their electrical, signal or mechanical interconnections.

Alternative embodiments further include a system that is configured for distribution of forces using a radial assembly of bearings or rotational transferring elements, fitted internal and/or external of the chamber elements.

Alternative embodiments further include a system that is configured to change the numbers, or dimensions of chambers or elastic elements, for modular alteration of an isolation value, dampen frequency or magnitude ranges, offered by an embodiment.

Some embodiments further include a system capable of modifying duration of the dissipation cycle, by way of example, providing replenishment of an hydraulic, or force actuation to the elastic element(s), as the embodiment may or otherwise, simultaneously perform dissipation of an intruding vector. And provide a continuous cycling of dampen/dissipation properties, before full dissipation.

Throughout the disclosure, the CPS dampen, dissipation, deflection and isolation control system is also referred to as a CPS isolation control system, and may refer to or associate any of its functions or attributes, recognizing the embodiment as a system, regardless of the presence of any function, method or attribute in a particular application.

The invention claimed is:

1. A centripetal phase shift (CPS) isolation control system in a sudden acceleration episode of a vehicle comprising:
    a first structure configuration of a designated mass, comprising a chamber element;
    a second structure configuration of a designated mass, comprising a chamber element;
    an elastic element interposed at the chamber elements;
    a sensor in signal communication with an electronic control unit (ECU); and
    a gait configuration system comprising:
    a delineation of the vehicle and associated mass as protected mass or PM for the first structure, and unprotected mass or UPM for the second structure; and
    a moveable attachment of the PM to the UPM; and
    a selective connection of the PM to the UPM in signal connection with the ECU; and
    an identified gait comprising configurative instruction for the alignment of a PM inertia vector transfer to a specified predetermined direction timing and resistance of a dissipation path in isolation of a UPM qualified by a set of embodiment vessel or vehicle and intruding mass bearing direction and product of travel inertia upon a vector transfer,
    the PM being configured to align the PM inertia vector for performance in a predetermined direction, timing and resistance of an isolated dissipation path as directed by the ECU, and
    the PM inertia vector being substantially dissipated, and
    the PM being configured to a predetermined and isolated dissipation path, direction, timing and resistance; and
    the PM being substantially isolated of the UPM vector.

2. The system of claim 1, further comprising a plurality of identified gaits each comprising configurative instruction for the alignment of a PM inertia vector transfer to a rotational degree of freedom for the specified path and direction of its isolated deflection dampen dissipation (DDD).

3. The system of claim 1, further comprising a plurality of identified gaits each comprising configurative instruction for the alignment of a PM inertia vector transfer to a rotational degree of freedom in one of a further plurality of specified deflection dampen dissipation (DDD) paths.

4. The system of claim 1, further comprising a plurality of identified gaits each comprising configurative instruction for the alignment of a PM inertia vector transfer to a rotational degree of freedom in one of a further plurality of specified deflection dampen dissipation (DDD) path directions.

5. The system of claim 1, further comprising a plurality of identified gaits each comprising configurative instruction for the alignment of a PM inertia vector transfer to a rotational degree of freedom by the presence of one of a further plurality of travel inertia bearings of an embodiment vehicle, relative to one of a further plurality of an intruding mass travel inertia bearings further comprising one of a plurality of directions and products of travel inertia qualifying a path and direction of isolated deflection dampen dissipation DDD.

6. The system of claim 1, further comprising a plurality of identified gaits each comprising configurative instruction for the alignment of a PM inertia vector transfer to a rotational degree of freedom in one of a further plurality of specified paths of isolated deflection dampen dissipation (DDD) and one of a further plurality of directions qualified by one of a further plurality of travel inertia bearings of an embodiment vehicle relative to one of a further plurality of an intruding mass travel inertia bearings, and one of a further plurality of directions and products of travel inertia upon a vector transfer.

7. The system of claim 1 wherein the PM and UPM chamber elements further comprise a sum greater than two.

8. The system of claim 1 wherein a movable attachment further comprises a 360 degree free association.

9. The system of claim 1 wherein a point of vector transfer is further any point within a 360 degree origin of the embodiment datum.

10. The system of claim 1 wherein the PM is substantially isolated of a vector transfer from a further one of a plurality of points of a 360 origin.

11. The system of claim 1, further comprising a plurality of elastic elements interposed at the chamber elements.

12. A vehicle comprising:
  a complete set of vehicle, cargo and occupant elements in a configuration comprising a protected mass (PM) and an unprotected mass (UPM); and
  a centripetal phase shift (CPS) isolation control system assembly, including respective chambers operatively connected to the associated PM and UPM of the vehicle, whereby the assembly provides for isolation and deflection dampen dissipation of a mass independent of the UPM, maintaining a stable dimensional connection with the PM chamber.

13. A centripetal phase shift (CPS) isolation control system method comprising:
  providing a vehicle with a designated protected mass (PM) and an unprotected mass (UPM);
  providing an isolation control device operatively connected to the PM and UPM elements of the vehicle;
  providing a gait system in signal communication with an electronic control unit (ECU), a sensor set, a selective attachment device of the PM to the UPM;
  identifying a set of intruding vector and mass characteristics, comprising speed, acceleration, position and direction of an intruding mass;
  identifying a set of vector and mass characteristics of the PM and UPM;
  identifying a point of UPM vector transfer in real time and anticipatory;
  identifying a qualified gait of the gait configuration system;
  signaling disconnection of the PM from the UPM in providing free association of the PM; and
  signaling an alignment of the PM in arming the elastic elements associated with the qualified gait to prescribed resistance values, forecasted sequence timings and deflection dampen dissipation (DDD) rates determined by the ECU, providing for a preferred method of DDD;
  wherein the embodiment is configured for a PM inertia vector transfer; and
  wherein upon PM inertia vector transfer, a transposition of the vector to a rotational degree of freedom manifests, deflecting the vector to a contained dissipative format, managing the direction and DDD path of the PM, substantially isolated of the UPM.

14. The CPS isolation control system method of claim 13, further comprising:
  providing for continuing sensor communications of the concurrent vector, UPM and PM status to the controller, following initiation of the CPS isolation control system,
  wherein continued monitoring of the PM and UPM, for effect of the embodiment and vector influence is provided.

15. The CPS isolation control system method of claim 13, further comprising:
  providing a preferred vector deflection dampen dissipation (DDD) method, alternate elastic elements, alternate gait or timing, based on the updated system status and databases,
  wherein, a modified or alternate DDD isolation is delivered, through the embodiment adjusting for further real-time conditions of an incident.

16. The CPS isolation control system method of claim 13, further comprising:
  re-initiating the gait system, at least one additional time, in part, or whole, by direction of the ECU, in result of the PM or UPM status, wherein access to a repetitive set of deceleration forces extends the time history of deflection dampen dissipation (DDD) and isolation.

17. The CPS isolation control system method of claim 13, further comprising:
  initiating elastic elements, at least one additional time, in part or whole, by direction of the ECU, in result of the PM or UPM status, wherein access to a repetitive set of deceleration forces extends the time history of deflection dampen dissipation (DDD) and isolation.

* * * * *